United States Patent [19]
Roodvoets

[11] 3,939,133
[45] Feb. 17, 1976

[54] SYNERGISTIC PEROXIDE CURES FOR HIGH VINYL RUBBERS

[75] Inventor: Mark R. Roodvoets, Akron, Ohio

[73] Assignee: The Firestone Tire & Rubber Company, Akron, Ohio

[22] Filed: May 10, 1974

[21] Appl. No.: 468,701

[52] U.S. Cl. .......... 260/85.1; 260/94.7 A; 260/879; 260/23.7 M
[51] Int. Cl. .......................... C08d 5/02; C08d 3/08
[58] Field of Search......... 260/94.7 A, 85.1, DIG. 1, 260/DIG. 2; 450/372.8, 623.5

[56] References Cited
UNITED STATES PATENTS

| | | | |
|---|---|---|---|
| 3,584,080 | 6/1971 | Walker et al. ...................... | 260/889 |
| 3,635,934 | 1/1872 | Schaffhauser et al. ........ | 260/94.7 A |
| 3,653,933 | 1/1972 | Schaffhauser et al. ........ | 260/94.7 A |
| 3,794,638 | 2/1974 | Westermann .................. | 260/94.7 A |

Primary Examiner—William F. Hamrock

[57] ABSTRACT

High vinyl polybutadiene having an increased cure rate and superior properties comprises a peroxide curing agent selected from the class consisting of dicumyl peroxide, t-butyl perbenzoate, bis(t-butylperoxy) diisopropyl benzene, and n-butyl 4,4-bis(t-butylperoxy) valerate in combination with a peroxide selected from the class consisting of benzoyl peroxide, bis(4-t-butylcyclohexyl) peroxydicarbonate, t-butyl peroctoate, 2,5-dimethyl-2,5-bis(t-butylperoxy)-hexane, 2,5-dimethyl-2,5-bis(t-butylperoxy)-hexyne-3, and t-butyl hydroperoxide.

24 Claims, No Drawings

SYNERGISTIC PEROXIDE CURES FOR HIGH VINYL RUBBERS

BACKGROUND OF THE INVENTION

The present invention relates to an increased cure late for high vinyl rubbers. More specifically, the present invention relates to the use of synergistic combinations of organic peroxides to increase the cure rate as well as the physical properties of high vinyl rubber without an increase in cure temperature or amount of peroxide.

Heretofore, in the field of curing polymers, organic peroxides have been used. This use of peroxides has also been extended into the field of high vinyl (1,2-configuration) rubbers (polybutadiene and copolymers thereof). However, cure rates are generally lower than desirable and hence injection molding and other processes are somewhat limited by the cure rate. Slower cycle time in the production of articles or slower production time in the manufacture of continuous articles such as sheets of course increase the production cost.

Generally, no prior art is known whereby the cure rate of high vinyl rubbers has been increased.

SUMMARY OF THE INVENTION

Accordingly, it is an object of the present invention to increase the cure rates of high vinyl rubber or polybutadiene polymer and polybutadiene-styrene copolymer resins.

It is another object of the present invention to increase cure rates of high vinyl rubber resins through the use of synergistic combinations of peroxides.

It is a further object of the present invention to improve the physical properties of high vinyl rubber resins.

It is still another object of the present invention to improve the cure rates of high vinyl rubber resins through the use of generally a class of high temperature peroxides in combination with generally a lower temperature class of peroxides.

It is a still further object of the present invention to provide articles made from high vinyl rubber resins which have improved cycle and process times and are thus less costly to produce or manufacture.

These and other objects of the present invention, together with the advantages thereof over existing prior art compounds and methods which will become apparent from the following specification are accomplished by the compounds and methods herein described and claimed.

In general, the high vinyl polybutadiene resin comprises by weight, 100 parts of a polybutadiene resin selected from the class consisting of the homopolymer of butadiene or the copolymer of butadiene and styrene containing at least 40 percent of butadiene, at least 50 percent of the butadiene repeating unit in the polymer or copolymer being in the 1,2-configuration, from 0.4 to about 4.0 parts based upon an equivalent amount of dicumyl peroxide of a peroxide curing agent selected from a first class consisting of dicumyl peroxide, t-butyl perbenzoate, bis(t-butylperoxy) diisopropyl benzene, and n-butyl 4,4-bis(t-butylperoxy) valerate and from 0.2 to about 2.0 parts based upon an equivalent amount of dicumyl peroxide of a peroxide curing agent selected from a second class consisting of benzoyl peroxide, bis(4-t-butylcyclohexyl) peroxydicarbonate, t-butyl peroctoate, 2,5-dimethyl-2,5-bis (t-butylperoxy)-hexane, 2,5-dimethyl-2,5-bis(t-butylperoxy)-hexyne-3, and t-butyl hydroperoxide.

DESCRIPTION OF THE PREFERRED EMBODIMENTS

According to the concepts of the present invention, high vinyl rubbers are cured through the use of synergistic peroxide combinations. More specifically, the high vinyl rubbers of the present invention are polymers of butadiene or copolymers of butadiene-styrene or in lieu of styrene other ethylenically unsaturated compounds such as $\alpha$-methyl styrene wherein the copolymer contains at least 40 percent by weight of butadiene. Such resins or high vinyl polybutadiene or copolymer of polybutadiene may also include up to about 60 percent by weight of ethylenically unsaturated compounds which are incorporated by curing. Generally, any vinyl monomer such as divinyl benzene and vinyl toluene may be used. These resins are usually prepared by using conventional free radical or anionic catalysts so that they have a molecular weight of say between 1,000 to 200,000 and a workable or flowable viscosity or consistency. Moreover, the resins of the present invention may contain conventional fillers, reinforcing fibers and fabrics, pigments, flame retardants and the like.

Generally, although the average molecular weight of the polymer or copolymer resins may usually be of any value within the above range, an average molecular weight (determined by intrinsic viscosity measurement) ranges from about 10,000 to about 100,000 for good processabilitty and good flow characteristics such as during molding. Desirably, at least 50 percent of the polymers and preferably 90 percent have a molecular weight above 10,000 with at least 95 percent having a molecular weight above 2,000. The presence of higher proportions of polymers having molecular weights below these limitations generally cause slow curing rates and have poor physical properties in the cured product. Additionally, the polybutadiene portion of the resins desirably has a vinyl content of at least 50 percent by weight and preferably 80 percent or 90 percent. That is, the butadiene units are incorporated into the polymeric chain largely in the 1,2-configuration.

Various ingredients may be added to the resins as above noted such as fillers, reinforcing agents and the like. A preferred filler and reinforcing agent is silica which may be incorporated to the extent of from 100 to about 500 parts by weight per 100 parts of resin. Additionally, often other desirable fillers include glass fiber either as a chop filler or as a glass fabric in a laminate in which situation the glass fiber serves the purpose of a filler and prevents crazing and cracking during fast cures. Since fillers generally produce a stiff product when cured, they are generally not utilized in applications wherein flexible properties are desirable such as in electrical wiring. As above noted, other compounds which may be added are the various vinyl monomers.

The various fillers, reinforcing agents, compounding ingredients and the like are then mixed in a container. Solvents such as hexane, heptane and toluene may be utilized and the resulting slurry stirred until the various compounds are blended. However, the use of solvents need not be utilized since the various compounds can be adequately dry blended. Additionally, dry blending is often preferred in actual production since it tends to be more economical in that the need for solvents is eliminated as well as the later removal of the solvent as through a vacuum.

Yet another compound which may be added to the resins are the metallic salts of higher fatty acids containing from 8 to about 26 carbon atoms wherein the preferred metals are calcium, magnesium, zinc, and cadmium. Generally, the metal may be selected from group 2A or 2B of the periodic table (Handbook of Chemistry and Physics, 46th Edition, The Chemical Rubber Company, 1965 – 1966, Page B-3). Examples of desirable metallic soaps include calcium 2-ethyl-hexanoate, calcium octoate, calcium laurate, calcium myristate, calcium stearate, calcium palmitate, calcium oleate, calcium arachidate, magnesium stearate, magnesium octotate, magnesium oleate, zinc stearate, zinc oleate, zinc laurate, cadmium stearate and mixtures thereof in any proportion. A preferred metallic soap is calcium stearate. A desirable amount of the metallic soaps by weight for 100 parts of resin is from about 0.5 to about 5.0 parts with about 2.0 to about 4.0 parts being a preferred range. Metallic salts are often used since generally they seem to impart desirable molding properties and tend to have a heat stabilizing effect such as on the flexural strength of the resins. Additionally, they tend to act as internal lubricants and thus act as mold releasing agents.

the synergistic peroxides of the present invention which give increased cures are combinations of various specific classes of peroxides. Generally, it has been found that a peroxide from a first or generally a high temperature class must be in combination with a peroxide from a second or generally lower temperature class to produce synergistic results. Examples of specific peroxides from the first class include dicumyl peroxide, t-butyl perbenzoate, bis(t-butylperoxy) diisopropyl benzene, and n-butyl 4,4-bis(t-butylperoxy) valerate. The amount of so-called high temperature dicumyl peroxide generally ranges from 0.4 to about 4.0 parts by weight based upon 100 parts of high vinyl rubber resin. The remaining peroxides have the same range based on their equivalent weight to dicumyl peroxide. That is, the actual amount of the other peroxides will be dependent upon their molecular weight, purity and number of effective radicals to dicumyl peroxide. A preferred range extends from about 1.5 to about 3.0 parts with approximately 2.0 parts being an optimum or highly preferred amount.

Specific examples of the second class of peroxides include benzoyl peroxide, bis(4-t-butylcyclohexyl) peroxydicarbonate, t-butyl peroctoate, 2,5-dimethyl-2,5-bis(t-butylperoxy)-hexane, 2,5-dimethyl-2,5-bis(t-butylperoxy)-hexyne-3, and t-butyl hydroperoxide. The amount of peroxides from this class will generally range from 0.25 to about 2.5 parts by weight. Herein again, all amounts are in equivalents to dicumyl peroxide. A preferred class extends from about 0.5 to about 2.0 parts with a highly preferred or optimum amount being approximately 1.0 part. In general, the amount of peroxide from the first class is desirably slightly greater than the amount from the second class in order to achieve a high synergistic result and superior properties. More specifically, the ratio by weight of the first class to the second class can vary from about 1.1 to about 3.5 with a preferred range being from 1.5 to 3.2. It should be realized that since synergistic results are obtained, the reason for which is not fully understood, the amount by weight of peroxides in the first class to those of the second class may vary from one combination to another in order to achieve the best result for each combination. In general, preferred combinatiions have been found to include dicumyl peroxide, bis(t-butylperoxy) diisopropyl benzene or t-butyl perbenzoate in combination with benzoyl peroxide and dicumyl peroxide in combination with bis(4-t-butylcyclohexyl) peroxydicarbonate or 2,5-dimethyl-2,5-bis(t-butylperoxy)-hexane on approximately a two to one weight ratio.

Concerning the synergistic combinations of peroxides of the present invention, it has been found that the total amount of synergistic peroxide combination required is not greater than the required cure amount of a single peroxide and may even be less. Thus, from about 0.5 to about 6.0 parts by weight of peroxide per 100 parts of polymer resin are generally required. Of course, the exact or preferred amounts desired for the production of any particular article will vary to some extent depending upon the specific synergistic combination utilized, the curing temperature, the vinyl content of the polymer resin, and the amount and type of fillers contained in the polymer resin. The reasons for such variations are well known to those skilled in the art and are generally as follows. As the curing temperature is increased, the total amount of peroxide required is lowered since the peroxides decompose at a faster rate. Similarly, as the cure time is increased, a lower catalyst level is required because a given amount decomposes to a greater extent. Since various fillers tend to be good heat conductors or conduct heat better than the polymer resin itself, increased amounts of such fillers will tend to reduce the total amount required of the peroxides and will tend to obscure any cure rate increase. The percentage of vinyl content of the polymer resin tends to dramatically affect the total amount of peroxide required since coupling or crosslinking occurs through such vinyl sites. Thus, for a low vinyl content, very roughly about 6 parts of peroxides are required whereas for a vinyl content in excess of 90 percent only an amount of roughly 3 parts is required.

The high vinyl resins including any additives such as fillers, pigments, soaps and the like with the particular peroxide combinations of the present invention may be cured at a temperature of from about 250°F to about 420°F and even higher or lower at times. A preferred temperature range has been found to extend from about 280°F to about 350°F. Of course, generally higher temperatures will give quicker cures. Often however due to practical considerations such as the thickness of items being molded or of sheets, a quick cure is not desirable since due to an exothemic reaction, cracking may occur throughout the item.

Since the peroxide compounds of the present invention give faster cures, shorter cure cycles as well as cure times in continuous processes are required thus allowing faster production and reduced cost. Moreover, due to the shorter cure times, thick articles can be cured through at a much more even cure than heretofore. This result is probably attributed to the fact that the peroxide combinations of the present invention are initiated at a lower temperature and thus do not reach high temperatures which cause cracking. Such factors thus permit thicker items to be molded and tend to permit more articles to be cured at lower temperatures such as when steam is used as the heat source rather than electricity.

In addition to the increased cure rate, the various peroxide combinations of the present invention produce high vinyl polymers having unexpected increases in physical properties. That is, properties such as tensile strength, flexural modulus, flexural strength, tensile modulus and hardness are all increased whereas percent elongation to fracture is decreased. Such properties are generally highly desirable in most applications of the cured resin. Thus, not only can articles having much higher physical properties be produced, but where desired, articles having the same physical properties as before may be produced using less peroxide material. of course, the cured high vinyl polybutadiene resins of the present invention may be used in any situations and applications as the heretofore normally cured resins. Thus, the synergistic cured resins may be used in sheet molding, bulk molding, injection molding, for potting compounds, structural materials, general high temperature uses, as well as for electrical insulators. Generally, the synergistic cure resins of the present invention may also be used wherever polymers such as epoxy, phenolic or thermosetting polyesters are used.

The invention will be more fully understood by reference to the Tables below. Samples according to formulations set forth in Table I were prepared by solution mixing in a Hobart Mixer followed by vacuum drying. These samples were molded in a flash mold and electric compression press under 20 tons pressure. The cured samples were tested using an Instron machine under ASTM thermoset conditions. Comparison of the combination peroxide cures of the present invention were made by comparing the results with a conventional formulation utilizing a single peroxide. The increase in physical properties of the unique formulations are set forth in Table II. It is noted that increases in curing rates are generally noted by highr physical properties and shorter cure times than the control and that increased physical properties are shown in comparison of the optimum results.

Table I sets forth the formulation for various controls and samples. All of the samples contain 3.0 parts per 100 parts of resin (PHR) of calcium stearate and approximately 1.0 parts of vinyl triacetoxysilane per 100 parts of filler.

TABLE I

| COMPOUND | Control A | 1 | 2 | 3 | 4 | Control B | 5 | 6 |
|---|---|---|---|---|---|---|---|---|
| 80%+ Vinyl Polybutadiene | 100.0 | 100.0 | 100.0 | 100.0 | 100.0 | 100.0 | 100.0 | 100.0 |
| phr Silica | 150.0 | 150.0 | 150.0 | 150.0 | 150.0 | 150.0 | 150.0 | 150.0 |
| Dicumyl Peroxide | 3.0 | 2.0 | 2.0 | 2.0 | 1.5 | | | |
| Bis(4-t-butyl-cyclohexyl) peroxydicarbonate | | 1.0 | | | | | | 1.0 |
| Benzoyl Peroxide | | | 1.0 | | 1.5 | | 1.0 | |
| 2,5-dimethyl-2,5-bis(t-butylperoxy)-hexane | | | | 1.0 | | | | |
| Bis(t-butylperoxy) diisopropyl benzene | | | | | | 3.0 | 2.0 | 2.0 |

| COMPOUND | Control C | 7 | Control D | 8 | 9 | 10 | 11 |
|---|---|---|---|---|---|---|---|
| 80%+ Vinyl Polybutadiene | 100.0 | 100.0 | 100.0 | 100.0 | 100.0 | 100.0 | 100.0 |
| phr Silica | 150.0 | 150.0 | 380.0 | 380.0 | 380.0 | 380.0 | 380.0 |
| Dicumyl Peroxide | 4.0 | 3.0 | 3.0 | 2.0 | 2.0 | 2.0 | 2.0 |
| Bis(4-t-butyl-cyclohexyl) peroxydicarbonate | | | | | | 1.0 | |
| Benzoyl Peroxide | | | | | 1.0 | | |
| 2,5-dimethyl-2,5-bis(t-butylperoxy)-hexane | | 1.0 | | | | | |
| t-butyl hydroperoxide | | | | 1.0 | | | |
| t-butyl perootoate | | | | | | | 1.0 |

| COMPOUND | Control E | 12 | 13 | 14 | 15 | 16 | Control F | 17 |
|---|---|---|---|---|---|---|---|---|
| 80%+ Vinyl Polybutadiene | 100.0 | 100.0 | 100.0 | 100.0 | 100.0 | 100.0 | 100.0 | 100.0 |
| phr Silica | 380.0 | 380.0 | 380.0 | 380.0 | 380.0 | 380.0 | 150.0 | 150.0 |
| t-butyl perbenzoate | 3.0 | 2.0 | 1.5 | 2.0 | 2.0 | 2.0 | | |
| bis(4-t-butyl-cyclohexyl) peroxydicarbonate | | 1.0 | | | | | | |
| Benzoyl peroxide | | | 1.5 | | 1.0 | | | 1.0 |
| t-butyl hydroperoxide | | | | 1.0 | | | | |
| t-butyl peroctoate | | | | | | 1.0 | | |
| n-butyl 4,4-bis (t-butylperoxy) valerate | | | | | | | 3.0 | 2.0 |

TABLE II

| COMPOUND | Control A | 1 | 2 | 3 | 4 |
|---|---|---|---|---|---|

FLEXURAL MODULUS PSI (THOUSANDS)

Times & Temp.

TABLE II-continued

| COMPOUND | Control A | 1 | 2 | 3 | 4 |
|---|---|---|---|---|---|
| FLEXURAL MODULUS PSI (THOUSANDS) | | | | | |
| 1' at 350°F | | | | 687 | |
| 2' | 719 | | | 675 | 630 |
| 4' | 662 | 739 | 666 | 703 | 685 |
| 7' | 651 | 704 | 655 | 744 | 706 |
| 4' at 325°F | 499 | 445 | 595 | 358 | 423 |
| 7' | 585 | 636 | 638 | 666 | 656 |
| 13' | 630 | 651 | 736 | 751 | 685 |
| 23' | | 671 | 701 | | |
| 13' at 300°F | | | | 211 | |
| 23' | | | | 641 | |
| FLEXURAL STRENGTH PSI | | | | | |
| 1' at 350°F | | | | 7862 | |
| 2' | 7991 | | | 8951 | 9852 |
| 4' | 6491 | 8604 | 6993 | 8655 | 9367 |
| 7' | 5190 | 8128 | 8057 | 7474 | 8780 |
| 4' at 325°F | 7600 | 8407 | 9615 | 7085 | 8413 |
| 7' | 8004 | 9028 | 9647 | 8717 | 10410 |
| 13' | 5987 | 8233 | 7814 | 9011 | 10130 |
| 23' | | 7678 | 7345 | — | — |
| 13' at 300°F | | | | 4697 | 1196 |
| 23' | | | | 9694 | |

| COMPOUND | Control B | 5 | 6 |
|---|---|---|---|
| FLEXURAL MODULUS PSI (THOUSANDS) | | | |
| 2' at 350°F | | 347 | 327 |
| 4' | 648 | 649 | 718 |
| 6' | | 718 | 723 |
| 8' | | 649 | 690 |
| 4' at 325°F | 337 | — | — |
| 8' | | 399 | 366 |
| 12' | | 616 | 584 |
| FLEXURAL STRENGTH PSI | | | |
| 2' at 350°F | | 7510 | 5904 |
| 4' | 8781 | 9885 | 9923 |
| 6' | | 10060 | 9001 |
| 8' | | 9693 | 8841 |
| 4' at 325°F | 7129 | — | — |
| 8' | | 7503 | 7271 |
| 12' | | 9774 | 8984 |

| COMPOUND | Control C | 7 |
|---|---|---|
| FLEXURAL MODULUS PSI (THOUSANDS) | | |
| 2' at 340°F | 764 | 727 |
| 4' | 891 | 876 |
| 8' | 912 | 915 |
| 2' at 325°F | 530 | 620 |
| 4' | 884 | 903 |
| 8' | 926 | 918 |
| 16' | 915 | 966 |
| FLEXURAL STRENGTH PSI | | |
| 2' at 340°F | 9873 | 10070 |
| 4' | 11450 | 12560 |
| 8' | 11180 | 12780 |
| 2' at 325°F | 7545 | 8017 |
| 4' | 11330 | 12310 |
| 8' | 12220 | 12650 |
| 16' | 10910 | 13220 |

| | Control D | 8 | 9 | 10 | 11 |
|---|---|---|---|---|---|
| OPTIMUM FLEXURAL MODULUS PSI × 10$^{+3}$ | | | | | |
| Cure Temp. | | | | | |
| at 350°F | 1310 | 1322 | 1563 | 1580 | 1412 |
| at 325°F | 1146 | 1382 | 1367 | 1442 | 1317 |
| at 300°F | 1120 | 1220 | 1525 | 1421 | 1160 |
| OPTIMUM FLEXURAL STRENGTH PSI | | | | | |
| at 350°F | 9600 | 11760 | 12590 | 12760 | 10790 |
| at 325°F | 11790 | 11980 | 12710 | 12470 | 11360 |
| at 360°F | 11150 | 12250 | 13340 | 12730 | 10970 |

| COMPOUND | Control E | 12 | 13 | 14 | 15 | 16 |
|---|---|---|---|---|---|---|
| OPTIMUM FLEXURAL MODULUS PSI × 10$^{+3}$ | | | | | | |
| Cure Temp. | | | | | | |
| at 280°F | 520 | 904 | 1082 | 593 | 393 | 1037 |

| COMPOUND | Control A | 1 | 2 | 3 | 4 |
|---|---|---|---|---|---|
| FLEXURAL MODULUS PSI (THOUSANDS) | | | | | |
| at 305°F | 637 | 1408 | 1045 | 723 | 392 | 1351 |
| at 330°F | 508 | 1404 | 1007 | 798 | 1211 | 1361 |
| OPTIMUM FLEXURAL STRENGTH PSI | | | | | |
| at 280°F | 5800 | 8598 | 3400 | 8046 | 6987 | 11450 |
| at 305°F | 5800 | 10330 | 3300 | 8776 | 6931 | 12480 |
| at 330°F | 6000 | 10166 | 3800 | 8875 | 12130 | 12220 |

| COMPOUND | Control F | 17 |
|---|---|---|
| FLEXURAL MODULUS | | |
| Cure Temp. | | |
| 10' at 310°F | 314,400 | 329,300 |
| 4' at 340°F | 303,900 | 291,900 |
| 16' at 340°F | 46,280 | |
| 10' at 340°F | | 307,800 |
| TENSILE STRENGTH | | |
| 10' at 310°F | 4431 | 4436 |
| 4' at 340°F | 3781 | 3763 |
| 16' at 340°F | 1078 | |
| 10' at 340°F | | 2370 |

As readily apparent from the data in Table II, higher physical properties were obtained for the same time of cure as the controls thus indicating faster cure rate. Moreover, higher properties were obtained at the end of a cure cycle thus indicating the cured resin having, of course, better properties. Additionally, Control F and Compound 17 show that with the use of synergistic peroxides of the present invention a lower reversion in properties is obtained upon excessive cure. Considering Samples 1 through 16 which were cured for optimum periods of time, it is quite apparent that vastly improved physical properties were obtained. In general, formulations or samples 1, 2, 6, 7, 9, 10 and 15 produced superior results and hence these combinations are preferred.

As apparent to one skilled in the art, various modifications can be made according to the concepts of the present invention without departing from the spirit of the invention herein disclosed. While in accordance with the Patent Statutes, the preferred embodiments have been described in detail, it is to be understood that the invention is not limited thereto; the scope of the invention being measured solely by the scope of the attached claims.

What is claimed is:

1. A peroxide cured high vinyl resin composition comprising by weight, 100 parts of a peroxide cured resin selected from the class consisting of a homopolymer of butadiene or a copolymer of butadiene and styrene containing at least 40 percent of butadiene, at least 80 percent of the butadiene repeating units in the polymer or copolymer being in the 1,2-configuration, said resin cured utilizing from 0.4 to about 4.0 parts based upon an equivalent amount of dicumyl peroxide of a peroxide curing agent selected from a first class consisting of dicumyl peroxide, bis (t-butylperoxy) diisopropyl benzene, t-butyl perbenzoate, and n-butyl 4,4-bis (t-butylperoxy) valerate and from 0.25 to about 2.5 parts based upon an equivalent amount of dicumyl peroxide of a peroxide curing agent selected from a second class consisting of benzoyl peroxide, bis (4-t-butylcyclohexyl) peroxydicarbonate, t-butyl perocto-ate, 2,5-dimethyl-2,5-bis(t-butylperoxy)-hexane, 2,5- dimethyl-2,5-bis (t-butylperoxy)-hexyne-3, and t-butyl hydroperoxide.

2. A cured high vinyl resin composition according to claim 1, wherein the amount of said first class of peroxide ranges from about 1.5 to about 3.0 parts and the amount of said second class of peroxide ranges from about 0.5 to about 2.0.

3. A cured high vinyl resin composition according to claim 1, wherein the ratio of the amount of peroxide of said first class to the amount of peroxide of said second class is 1.1 to about 3.5.

4. A cured high vinyl resin composition according to claim 1, wherein said second class of peroxide is selected from the group consisting of benzoyl peroxide, bis(4-t-butylcyclohexyl) peroxydicarbonate and 2,5-dimethyl-2,5-bis(t-butylperoxy)-hexane.

5. A cured high vinyl resin composition according to claim 1, wherein said dicuymyl peroxide, bis(t-butylperoxy) diiosopropyl benzene and t-butyl perbenzoate is in combination with benzoyl peroxide.

6. A curable high vinyl polybutadiene composition comprising by weight, 100 parts of a curable resin selected from the class consisting of a homopolymer of butadiene or a copolymer of butadiene and styrene containing at least 40 percent of butadiene, at least 80 percent of the butadiene repeating units in the polymer or copolymer being in the 1,2-configuration, from 0.4 to about 4.0 parts based upon an equivalent amount of dicuymyl peroxide of a peroxide curing agent selected from a first class consisting of dicumyl peroxide, t-butyl perbenzoate, bis (t-butylperoxy) diisopropyl benzene, and n-butyl perbenzoate, bis(t-butylperoxy) valerate and from 0.25 to about 2.5 parts based upon an equivalent amount of dicumyl peroxide of a peroxide curing agent selected from a second class consisting of benzoyl peroxide, bis (4-t-butylcyclohexyl) peroxydicarbonate, t-butyl peroctoate, 2,5-dimethyl-2,5-bis (t-butylperoxy)-hexane, 2,5-dimethyl-2,5-bis(t-butylperoxy)-hexyne-3, and t-butyl hydroperoxide.

7. A curable high vinyl composition according to claim 6, wherein the amount of said first class of peroxide ranges from about 1.5 to about 3.0 and the amount of said second class of peroxide ranges from about 0.5 to about 2.0.

8. A curable high vinyl composition according to claim 6, wherein the ratio of the amount of peroxide of said first class to the amount of peroxide of said second class is about 1.1 to about 3.5.

9. A curable high vinyl composition according to claim 6, wherein said second class of peroxide is selected from the group consisting of benzoyl peroxide, bis(4-t-butylcyclohexyl) peroxydicarbonate and 2,5-dimethyl-2,5-bis(t-butylperoxy)-hexane.

10. A curable high vinyl composition according to claim 7, wherein said dicumyl peroxide, bis (t-butylperoxy) diiosopropyl benzene and t-butyl perbenzoate is in combination with benzoyl peroxide.

11. A process for producing a cured high vinyl resin, composition comprising the steps of, adding by weight 100 parts of a curable resin selected from the class consisting of a homopolymer of butadiene or a copolymer of butadiene and styrene containing at least 40 percent of polybutadiene, at least 80 percent of the polybutadiene repeating units in the polymer or copolymer being in the 1,2configuration, adding from 0.4 to about 4.0 parts based upon an equivalent amount of dicumyl peroxide of a peroxide curing agent selected from a first class consisting of dicumyl peroxide, t-butyl perbenzoate, bis (t-butylperoxy) diisopropyl benzene, and n-butyl 4,4-bis (t-butylperoxy) valerate and adding from 0.2 to about 2.5 parts based upon an equivalent amount of dicumyl peroxide of a peroxide curing agent selected from a second class consisting of benzoyl peroxide, bis (4-t-butylcyclohexyl) peroxydicarbonate, t-butyl hydroperoxide, t-butyl peroctoate, 2,5-dimethyl-2,5-bis(t-butylperoxy)-hexane and 2,5-dimethyl-2,5-bis(t-butylperoxy)-hexyne-3 and then curing said curable resin.

12. A process according to claim 11, wherein the amount of said first class of peroxide ranges from about 1.5 to about 3.0 and the amount of said second class of peroxide ranges from about 0.5 to about 2.0.

13. A process according to claim 11, wherein the ratio of the amount of peroxide of said first class to the amount of peroxides of said second class is about 1.1 to about 3.5.

14. A process according to claim 11, wherein said second class of peroxide is selected from the group consisting of benzoyl peroxide, bis(4-t-butylcyclohexyl) peroxydicarbonate and 2,5-dimethyl-2,5-bis(t-butylperoxy)-hexane.

15. A process according to claim 11, wherein said dicumyl peroxide, bis (t-butylperoxy) diiosopropyl benzene and t-butyl perbenzoate is in combination with benzoyl peroxide.

16. A peroxide cured high vinyl resin composition according to claim 1 wherein at least 90 percent of the butadiene repeating units are in the 1,2 configuration.

17. A cured high vinyl resin composition according to claim 1, wherein the amount of said first class peroxide agent is about 2 parts of the amount of said second class of peroxide agent is about 1 part.

18. A cured high vinyl resin composition according to claim 1, wherein said first peroxide curing agent is dicumyl peroxide and said second class of peroxide curing agent is selected from the class consisting of bis (4-t-butylcyclohexyl) peroxydicarbonate and 2,5-dimethyl-2,5-bis(t-butylperoxy)-hexane.

19. A curable high vinyl polybutadiene composition according to claim 6, wherein at least 90 percent of the butadiene repeating units are in the 1,2 configuration.

20. A curable high vinyl polybutadiene composition according to claim 6, wherein the amount of said first class peroxide agent is about 2 and the amount of said second class peroxide agent is about 1.

21. A curable high vinyl polybutadiene composition according to claim 6, wherein said first class peroxide curing agent is dicumyl peroxide and the second class peroxide curing agent is selected from the class consisting of bis(4-t-butylcyclohexyl) peroxydicarbonate and 2,5-dimethyl-2,5-bis(t-butylperoxy)-hexane.

22. A process according to claim 11, wherein at least 90 percent of the polybutadiene repeating units are in the 1,2 configuration.

23. A process according to claim 11, wherein the amount of said first class peroxide agent is about 2 and the amount of second class of peroxide agent is about 1.

24. A process according to claim 11, wherein said first class curing agent is dicumyl peroxide and said second class peroxide curing agent is selected from the class consisting of bis (4-t-butylcyclohexyl) peroxydicarbonate and 2,5-dimethyl-2,5-bis(t-butylperoxy)-hexane.

* * * * *

UNITED STATES PATENT OFFICE
CERTIFICATE OF CORRECTION

Patent No. 3,939,133         Dated February 17, 1976

Inventor(s)   Mark R. Roodvoets

It is certified that error appears in the above-identified patent and that said Letters Patent are hereby corrected as shown below:

Column 1, line 6 -- late -- should be - rate -

Column 3, line 26 -- the -- should be - The -

Column 4, line 1 -- combinatiions -- should be - combinations -

Column 6, line 10 -- highr -- should be - higher -

Table I, under second heading COMPOUND, last chemical term -- t-butyl perootoate -- should be - t-butyl peroctoate -

Signed and Sealed this

Twenty-eighth Day of September 1976

[SEAL]

Attest:

RUTH C. MASON
Attesting Officer

C. MARSHALL DANN
Commissioner of Patents and Trademarks